United States Patent
Asatsu et al.

(10) Patent No.: US 6,922,657 B2
(45) Date of Patent: Jul. 26, 2005

(54) APPARATUS AND METHOD OF DIAGNOSING MACHINERY DAMAGE FACTOR

(75) Inventors: Seiichi Asatsu, Zushi (JP); Masanori Murakami, Fujisawa (JP); Mitsuyoshi Okazaki, Tokorozawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/421,784

(22) Filed: Apr. 24, 2003

(65) Prior Publication Data

US 2003/0204333 A1 Oct. 30, 2003

(30) Foreign Application Priority Data

Apr. 25, 2002 (JP) ......................................... 2002-124449

(51) Int. Cl.[7] ........................... G06F 11/30; G06F 11/32
(52) U.S. Cl. ...................... 702/183; 702/184; 702/185
(58) Field of Search ................................ 702/183, 184, 702/185

(56) References Cited

U.S. PATENT DOCUMENTS

| 5,210,704 | A | * | 5/1993 | Husseiny | ..................... 702/34 |
| 5,602,761 | A | * | 2/1997 | Spoerre et al. | ............. 702/179 |
| 5,633,800 | A | * | 5/1997 | Bankert et al. | ............. 700/177 |
| 6,301,572 | B1 | * | 10/2001 | Harrison | ....................... 706/52 |
| 6,411,908 | B1 | * | 6/2002 | Talbott | ......................... 702/34 |
| 6,546,378 | B1 | * | 4/2003 | Cook | .......................... 706/12 |
| 6,694,285 | B1 | * | 2/2004 | Choe et al. | ................. 702/182 |

FOREIGN PATENT DOCUMENTS

JP 5-57528 8/1993

* cited by examiner

*Primary Examiner*—Bryan Bui
*Assistant Examiner*—Anthony T. Dougherty
(74) *Attorney, Agent, or Firm*—Oblon, Spivak, McClelland, Maier & Neustadt, P.C.

(57) ABSTRACT

A vibration diagnosis is performed by using a vibration mode interactive query section grasping vibration event of a machinery such as turbine rotor and characteristic feature thereof from detected data information, a vibration factor diagnosis section estimating a vibration factor based on the information from the vibration mode interactive query section, and a diagnosis result display section indicating the estimated vibration factor and a guidance for countermeasure to be taken against the vibration factor.

10 Claims, 10 Drawing Sheets

FIG. 2

|  | ELEMENT-1 | ELEMENT-2 | ... | ELEMENT-n |
|---|---|---|---|---|
| FACTOR-1 | SMALL MATRIX 1-1 | SMALL MATRIX 1-2 | ... | SMALL MATRIX 1-n |
| FACTOR-2 | SMALL MATRIX 2-1 | SMALL MATRIX 2-2 | ... | SMALL MATRIX 2-n |
| ⋮ | ⋮ | ⋮ |  | ⋮ |
| FACTOR-m | SMALL MATRIX m-1 | SMALL MATRIX m-2 | ... | SMALL MATRIX m-n |

FIG. 3

SUMMARY OF MATRIX (DATA OF SMALL MATRIX HAVING THE FOLLOWING FACTORS AND ELEMENTS)

| | | ELEMENT-1 | | | ELEMENT-2 | | | ELEMENT-3 | | | ELEMENT-4 | | |
|---|---|---|---|---|---|---|---|---|---|---|---|---|---|
| | | ANSWERING RATE | MATCHING RATE | PROBABILITY | ANSWERING RATE | MATCHING RATE | PROBABILITY | ANSWERING RATE | MATCHING RATE | PROBABILITY | ANSWERING RATE | MATCHING RATE | PROBABILITY |
| 1 | RESIDUAL UNBALANCE | 72 | -11 | -10 | 0 | 0 | 0 | 0 | 0 | 0 | 0 | 0 | 0 |
| 2 | SCATTERING AND COME-OFF OF ROTATING COMPONENTS | 69 | -20 | -18 | 68 | -13 | -11 | 73 | -19 | -17 | 0 | 0 | 0 |
| 3 | DE-CENTERING OF COUPLING (DURING OPERATION) | 71 | -14 | -10 | 72 | -42 | -38 | 87 | 13 | 12 | 0 | 0 | 0 |
| 4 | DE-CENTERING OF COUPLING (DURING CONNECTION WORK) | 77 | -21 | -19 | 77 | 17 | 15 | 86 | -3 | -3 | 71 | -13 | -12 |
| 5 | PERMANENT BENDING OF ROTOR | 67 | -3 | -3 | 78 | 7 | 7 | 0 | 0 | 0 | 0 | 0 | 0 |
| 6 | FOREIGN MATTERS ADHERES TO ROTOR | 79 | -44 | -41 | 0 | 0 | 0 | 0 | 0 | 0 | 0 | 0 | 0 |
| 7 | RUBBING (NORMAL RUBBING) | 64 | -25 | -22 | 65 | -53 | -46 | 0 | 0 | 0 | 0 | 0 | 0 |
| 8 | RUBBING (CARBONIZE LUBB) | 79 | -8 | -7 | 0 | 0 | 0 | 0 | 0 | 0 | 0 | 0 | 0 |
| 9 | HEAVY RUBBING (WATER INDUCTION) | 73 | -27 | 0 | 0 | 0 | 0 | 0 | 0 | 0 | 0 | 0 | 0 |
| 10 | THERMAL DEPENDENCE OF ROTOR | 82 | -17 | -15 | 73 | -29 | -26 | 90 | -8 | -8 | 0 | 0 | 0 |
| 11 | TEMPORARY BENDING OF ROTOR | 56 | -85 | 0 | 0 | 0 | 0 | 0 | 0 | 0 | 0 | 0 | 0 |
| 12 | TORQUE UNBALANCE | 78 | -10 | -9 | 0 | 0 | 0 | 0 | 0 | 0 | 0 | 0 | 0 |
| 13 | CHANGES IN BEARING SUPPORT CONDITIONS | 83 | -13 | -12 | 87 | 18 | 17 | 0 | 0 | 0 | 0 | 0 | 0 |
| 14 | ROTOR CRACK | 68 | 27 | 23 | 0 | 0 | 0 | 0 | 0 | 0 | 0 | 0 | 0 |
| 15 | CHATTERING OF BEARING SUPPORT SYSTEM | 91 | -3 | -3 | 0 | 0 | 0 | 0 | 0 | 0 | 0 | 0 | 0 |
| 16 | RANDOM VIBRATION BY EXCITATION OF STEAM AIR | 92 | 42 | 40 | 0 | 0 | 0 | 0 | 0 | 0 | 0 | 0 | 0 |
| 17 | VIBRATION PROPAGATION FROM FUNDAMENT/PIPING | 92 | 0 | 0 | 0 | 0 | 0 | 0 | 0 | 0 | 0 | 0 | 0 |
| 18 | OIL WHIP OR OIL WHIRL | 81 | 74 | 69 | 0 | 0 | 0 | 0 | 0 | 0 | 0 | 0 | 0 |
| 19 | AERATION | 84 | 47 | 44 | 0 | 0 | 0 | 0 | 0 | 0 | 0 | 0 | 0 |
| 20 | FLUTTERING OF PAD BEARING | 80 | 24 | 22 | 0 | 0 | 0 | 0 | 0 | 0 | 0 | 0 | 0 |
| 21 | STEAM WHIRL | 91 | 56 | 54 | 0 | 0 | 0 | 0 | 0 | 0 | 0 | 0 | 0 |
| 22 | ROTOR COILER SHORT | 52 | 0 | 0 | 0 | 0 | 0 | 0 | 0 | 0 | 0 | 0 | 0 |
| 23 | REVERSIBLE THERMAL UNBALANCE | 68 | 0 | 0 | 0 | 0 | 0 | 0 | 0 | 0 | 0 | 0 | 0 |
| 24 | NON-REVERSIBLE THERMAL UNBALANCE | 100 | -3 | -3 | 0 | 0 | 0 | 0 | 0 | 0 | 0 | 0 | 0 |
| 25 | SLIP STICK | 105 | 0 | 0 | 0 | 0 | 0 | 0 | 0 | 0 | 0 | 0 | 0 |
| 26 | NOT SUITABLE TO DETECTION BY VIBRATION METER | 100 | -25 | -25 | 0 | 0 | 0 | 0 | 0 | 0 | 0 | 0 | 0 |

| | SELECT | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| OPERATION ZONE WHEN VIBRATION GENERATES | 2 | 10 | 10 | 10 | | | | | | | | | | | | | | | | | |
| REPRODUCIBILITY | 3 | 10 | 10 | 5 | | | | | | | | | | | | | | | | | |
| TIME OF GENERATION | 2 | -10 | -10 | 5 | 10 | | | | | | | | | | | | | | | | |
| TIME-ELAPSED TENDENCY | 5 | 10 | 0 | 0 | 10 | 10 | -10 | | | | | | | | | | | | | | |
| CHANGE MODE (1) | 1 | 10 | -10 | | | | | | | | | | | | | | | | | | |
| CHANGE MODE (2) | 1 | 5 | 5 | 0 | 0 | 10 | 0 | 5 | -10 | -10 | | | | | | | | | | | |
| MAGNITUDE OF CHANGE | 2 | 20 | 10 | 5 | 5 | | | | | | | | | | | | | | | | |
| VIBRATION GENERATION/BEARING HAVING CHANGE | 2 | -10 | 20 | 0 | | | | | | | | | | | | | | | | | |
| MEMBER HAVING REMARKABLE VIBRATION | 1 | 20 | 10 | 0 | | | | | | | | | | | | | | | | | |
| VIBRATION DURING ROTATION | 6 | 10 | -10 | -10 | -10 | -10 | | | | | | | | | | | | | | | |
| SPEED RANGE | 7 | -10 | -10 | 10 | -10 | -10 | 20 | | | | | | | | | | | | | | |
| STARTUP MODE | 4 | 10 | 5 | 5 | 5 | | | | | | | | | | | | | | | | |
| LOAD CHANGE DIRECTION | 3 | 5 | 5 | 5 | 5 | -10 | 0 | | | | | | | | | | | | | | |
| GENERATED LOAD ZONE | 4 | 0 | 0 | 0 | | | | | | | | | | | | | | | | | |
| CORRELATION WITH OPERATION CHANGE | 19 | 10 | -10 | -10 | -10 | 10 | -10 | -10 | 10 | 10 | -10 | -10 | -10 | 10 | 10 | -10 | -20 | | | | |
| CORRELATION WITH OPERATION CHANGE | 19 | 10 | -10 | -10 | -10 | 10 | -10 | -10 | 10 | 10 | -10 | -10 | -10 | 10 | 10 | -10 | -20 | | | | |
| CORRELATION WITH OPERATION CHANGE | 19 | 10 | -10 | -10 | -10 | 10 | -10 | -10 | 10 | 10 | -10 | -10 | -10 | 10 | 10 | -10 | -20 | | | | |
| VIBRATION PHASE CHANGE | 7 | 0 | 0 | 0 | 0 | 0 | 0 | | | | | | | | | | | | | | |
| VIBRATION PHASE CHANGE | 7 | 0 | 0 | 0 | 0 | 0 | 0 | | | | | | | | | | | | | | |
| CHANGE DIRECTION OF PHASE | 4 | 0 | 0 | 0 | 0 | | | | | | | | | | | | | | | | |
| VIBRATION FREQUENCY | 1 | -30 | 30 | | | | | | | | | | | | | | | | | | |
| NON-SYNCHRONIZING COMPONENT | 9 | 20 | 20 | 10 | 10 | 10 | -10 | -10 | -10 | 10 | 10 | 10 | 10 | 10 | 10 | -10 | | | | | |
| PRESENCE OF ABNORMAL OPERATION OR NOT | 20 | -10 | -10 | -10 | -10 | -10 | -10 | -10 | -10 | -10 | -10 | -10 | -10 | 10 | 10 | -10 | 10 | -10 | -10 | | |
| PRESENCE OF ABNORMAL OPERATION OR NOT | 20 | -10 | -10 | -10 | -10 | -10 | -10 | -10 | -10 | -10 | -10 | -10 | -10 | 10 | 10 | -10 | 10 | -10 | -10 | | |
| PRESENCE OF ABNORMAL OPERATION OR NOT | 20 | -10 | -10 | -10 | -10 | -10 | -10 | -10 | -10 | -10 | -10 | -10 | -10 | 10 | 10 | -10 | 10 | -10 | -10 | | |
| TYPE OF BEARING | 4 | 0 | 0 | 0 | 10 | 20 | 5 | 5 | 5 | 5 | 5 | | | | | | | | | | |
| KIND OF VIBRATION METER | 1 | 0 | 0 | 0 | 0 | | | | | | | | | | | | | | | | |
| CLASSIFICATION OF ROTOR | 13 | 5 | 5 | 5 | 10 | 10 | 10 | 10 | 10 | 10 | 10 | | | | | | | | | | |
| ITEMS OF PERIODIC INSPECTION | 21 | | | | | | | | | | 5 | 5 | 5 | 10 | 10 | 10 | 10 | | | 10 | |
| ITEMS OF PERIODIC INSPECTION | 21 | | | | | | | | | | 10 | 10 | 5 | 10 | 10 | 10 | 10 | | | 10 | |
| ITEMS OF PERIODIC INSPECTION | 21 | | | | | | | | | | 5 | 10 | 5 | 10 | 10 | 10 | 10 | | | 10 | |
| ITEMS OF PERIODIC INSPECTION | 21 | | | | | | | | | | 5 | 10 | 5 | 10 | 10 | 10 | 10 | | | 10 | |
| CONDITION+CONDITION (BONUS) | 2 | 0 | 0 | | | | | | | | | | | | | | | | | | |
| CONDITION+CONDITION (BONUS) | 2 | 0 | 0 | | | | | | | | | | | | | | | | | | |
| CONDITION+CONDITION (BONUS) | 2 | 0 | 0 | | | | | | | | | | | | | | | | | | |
| CONDITION+CONDITION (BONUS) | 2 | 0 | 0 | | | | | | | | | | | | | | | | | | |

SPECIAL MEASUREMENT/ADDITIONAL INVESTIGATION/RECOMMENDED ITEM LIST (35)

1. RESIDUAL UNBALANCE
2. SCATTERING AND COME-OFF OF ROTATING COMPONENTS
3. DE-CENTERING OF COUPLING (DURING OPERATION)
4. DE-CENTERING OF COUPLING (DURING CONNECTION WORK AND TIME-ELAPSED CHANGE)
5. PERMANENT BENDING OF ROTOR
6. UNBALANCE CHANGE RESULTING FROM FOREIGN MATTERS ADHERING TO ROTOR
7. RUBBING (NORMAL RUBBING)
8. RUBBING (CARBONIZE LUBB)
9. HEAVY RUBBING (WATER INDUCTION)
10. THERMAL DEPENDENCE OF TURBINE ROTOR
11. ALIGNMENT CHANGE
12. POOR SLIDING OF BEARING SPHERICAL SURFACE AND BEARING SEAT

14. CHATTERING OF BEARING SUPPORT SYSTEM
15. TORQUE UNBALANCE (LOOSING OF COUPLING BOLT)
16. VIBRATION PROPAGATION FROM BEARING SEAT
17. VIBRATION PROPAGATION FROM FUNDAMENT/PIPING
18. OIL WHIP
19. AERATION (SHORT OF SUPPLY OIL)
20. FLUTTERING OF PAD BEARING
21. STEAM WHIRL
22. RANDOM VIBRATION BY EXCITATION OF STEAM FLOW
23. FAILURE OF PROBE CHIP OF VIBRATION METER
24. SCRATCH ON JOURNAL SURFACE
25. PROBE FLOATING

| # | Item | Condition | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|---|
| 1 | RECOMMEND FIELD BALANCE | IN OPERATION CONDITION | 1 | 1 | 1 | 1 | 1 | 1 |   |   |   |   |   |   |   |   |   |   | 1 |   |   |   |   |   |   |   |   |
| 2 | RECOMMEND TO OPEN WINDOW AFTER IMMEDIATELY STOPPED | IN OPERATION CONDITION |   |   | 1 |   |   |   |   |   |   |   |   |   |   |   |   |   |   |   |   |   |   |   |   |   |   |
| 3 | DATA SAMPLING BY PHASE ANGLE GATE | IN OPERATION CONDITION |   |   |   |   | 1 | 1 | 1 |   |   |   |   |   |   |   |   |   |   |   |   |   |   |   |   |   |   |
| 4 | RECOMMEND TO MEASURE VIBRATION OF COUPLING | IN OPERATION CONDITION |   |   | 1 | 1 | 1 |   |   |   |   |   |   |   |   |   |   |   |   |   |   |   |   |   |   |   |   |
| 5 | MEASURE RUN-OUT OF COUPLING AFTER STOP | IN OPERATION CONDITION |   |   |   |   |   | 1 |   |   |   |   |   |   |   |   |   |   |   |   |   |   |   |   |   |   |   |
| 6 | RECOMMEND TO INVESTIGATE WATER QUALITY AND STEAM PURITY | IN OPERATION CONDITION |   |   |   |   |   |   |   |   | 1 |   |   |   | 1 |   |   |   |   |   |   |   |   |   |   |   |   |
| 7 | MEASURE RUN-OUT OF THE CENTER PORTION OF ROTOR (HIP) | IN OPERATION CONDITION |   |   |   |   |   |   |   |   |   |   | 1 |   |   |   |   |   |   |   |   |   |   |   |   |   |   |
| 8 | RECOMMEND TO MAKE TEST BASED ON CHANGE OF DEGREE OF VACUUM | IN OPERATION CONDITION |   |   |   |   |   |   |   |   |   |   |   |   |   |   |   | 1 |   |   |   |   |   |   |   |   |   |
| 39 | PRESENCE OF OIL HOLE FOR VIBRATION DETECTOR OR NOT | IN OPERATION CONDITION |   |   |   |   |   |   |   |   |   |   |   |   |   |   |   |   |   |   |   |   |   |   | 1 |   |   |
| 40 | FINAL STAGE VISIBLE INSPECTION FROM MANHOLE OF EXHAUST CHAMBER | IN OPERATION CONDITION |   |   |   |   |   |   |   |   |   |   |   |   |   |   |   |   |   |   |   |   |   |   |   | 1 | 1 |
| 84 |   |   |   |   |   |   |   |   |   |   |   |   |   |   |   |   |   |   |   |   |   |   |   |   |   |   |   |
| 85 |   |   |   |   |   |   |   |   |   |   |   |   |   |   |   |   |   |   |   |   |   |   |   |   |   |   |   |

FIG. 8

APPARATUS AND METHOD OF DIAGNOSING MACHINERY DAMAGE FACTOR

BACKGROUND OF THE INVENTION

1. Field of the Invention

The present invention relates to apparatus for and method of diagnosing damage (or defect) factor of machinery or equipment, which is capable of accurately diagnosing a machinery damage factor for, for example, turbine rotors and generators during an operation for a short time, and the machinery damage factor for the turbine rotor may include vibration factor, shifting in location position, leak noise of steam, etc.

2. Related Art

For example, turbines such as a steam turbine, a gas turbine or a combined cycle turbine combining them have been applied to a power generation plant. In these turbines, for example, in the steam turbine, when failure occurs during the operation, but the failure is not overlooked without being found, there is a possibility that enormous accidents happen. In fact, some failures have been known and found.

In the steam turbine, the following factors for causing the failure are given.

That is, there are given: (1) poor aligning of turbine rotor (rotary shaft) and bearing; (2) rubbing noise (contact noise of turbine rotor with labyrinth packing); (3) eccentricity of turbine rotor and bearing; (4) lubrication failure due to shortage of lubricating oil; and (5) scratches on the surface of the turbine rotor and bearing internal surface, for example, shaft vibration is always monitored so as to collect data, and diagnosis is performed based on the collected data. In FIG. 10, there is shown a conventional vibration diagnosis apparatus having the configuration described above.

As seen from FIG. 10, a system load 1 is connected to a high-pressure turbine HP, a low-pressure turbine LP and a generator G coaxially combined with the low-pressure turbine via a circuit switch 2.

When the turbine starts or stops, a turning gear device 3 for turning (rotating) the turbine (at low speed) is connected directly to the shaft of a turbine rotor 4.

The shaft end of the high-pressure turbine HP is provided with a speed detector 5. The rotational speed of the turbine is converted into an electrical signal, and thereafter, is inputted to a failure (abnormality) diagnosis apparatus 6.

In the illustrated example, the turbine rotor 4 is provided with a vibration detector 5a for detecting vibration as one of machinery damage (damaging or damaged) factors. The detected signal is inputted to the failure diagnosis apparatus 6.

Each bearing of the turbine is provided with rub check detectors 7a, 7b, 7c, 7d and temperature detectors 8a, 8b, 8c, 8d for detecting a return oil temperature of the bearing. Further, each bearing of the turbine is attached with an ampere meter 10 for detecting a current of a motor for driving a turning gear. These above detectors 7a, 7b, 7c, 7d, 8a, 8b, 8c, 8d and 10 then generate signals, which are inputted to the failure diagnosis apparatus 6.

The failure diagnosis apparatus 6 includes an input processor 11 and a timer 12. The input processor 11 inputs turbine rotational speed and signals from the above vibration detector 5a, valve lift detector 17 of a steam valve (steam governing valve) 16, vibration detector, rub check detectors 7a, 7b, 7c, 7d, temperature detectors 8a, 8b, 8c, 8d and ampere meter 10 as input data. Further, the failure diagnosis apparatus 6 includes a memory 13, a controller 14 and a display device 15. The memory 13 receives the outputs of the input processor 11 and the timer 12 and receives speed reducing data in preset failure diagnosis and in a normal mode under the same condition and return oil temperature data of bearings during the operation of the turbine. The controller 14 acts to determine the failure (abnormality) based on the output from the memory 13. The display device 15 acts to display the failure thus determined, in addition to above matters. When steam ST is flowing through the steam valve 16, high-pressure turbine HP, low-pressure turbine LP and condenser 18, if any failure event happens, the turbine is stopped in response to the failure so as to prevent enormous accidents.

In the conventional steam turbine, for example, at a time when diagnosing shaft vibration, vibration generation events, vibration waveforms and the magnitude of waveform amplitude are calculated based on the above detection data. Thereafter, the vibration generation factor is estimated from the thus calculated data based on knowledge and experience of the diagnosis responsible (judgment) person. In this manner, suitable courses to be taken against the generation factor obtained from the above estimation have been prepared as vibration guidance.

However, the accuracy of the vibration generation factor thus estimated almost depends on a grade of vibration knowledge of a person, who diagnoses vibration.

For instance, if remarkably high unstable vibration is estimated from a natural frequency of a turbine rotor, the following factors of generating the above unstable vibration are considered. One is unstable vibration by an oil pump resulting from the oil film strength of lubricating oil of bearings or the shortage of lubricating oil of bearings. Another is unstable vibration resulting from steam vibrating the turbine. In order to specify the generated vibration and investigate the generation factor, the turbine operation mode and condition at a time when vibration generates is investigated in addition to the vibration waveform features at a time when vibration generates. Thereafter, the true generation factor has been found in collation with the vibration knowledge and experience rule.

For this reason, the following problem arises. Depending on the ability of a person (diagnosis responsible person), who is in charge of vibration diagnosis, remarkable difference appears in accuracy of vibration diagnosis result, probability and time spent until the diagnosis result is made. Thus, newly advanced improvement is required that all persons can accurately and relatively readily make diagnosis for a short time if they have common knowledge.

SUMMARY OF THE INVENTION

The present invention has been conceived in consideration of the above circumstances, and an object of the present invention is to provide apparatus for and method of diagnosing damage factors of machinery such as turbine rotor, which can accurately and relatively readily make machinery damage diagnosis for a short time without depending on knowledge and experience of a person, who is in charge of the damage diagnosis.

This and other objects of the present invention can be achieved by providing, in one aspect, an apparatus for diagnosing damage factor of machinery comprising;

a machinery damage mode interactive query section grasping damage factor event of machinery and characteristic feature thereof from data information given;

a machinery damage factor diagnosis section estimating a damage factor based on the information from the machinery damage mode interactive query section; and a diagnosis result display section indicating the estimated damage factor and a guidance for countermeasure to be taken against the damage factor.

In the preferred embodiments or examples, the machinery damage factor diagnosis section includes a diagnosis matrix section, which is composed of several small matrixes featuring a plurality of machinery damage factors base on damage factor event, characteristic feature and damage generated conditions, and includes a diagnosis engine section, which builds up one matrix by collecting several small matrixes.

In this embodiment, the diagnosis matrix section may include a structure a matrix table on the basis of the machinery damage factor having direct relation to the damage factor event and feature and gives a weighing point to an intersect portion of the table in accordance with a relation of the damage factor to the damage factor event and feature. The diagnosis engine section may include a structure giving minus point to the damage factor event and feature having low damage factor probability in the matrix table. The diagnosis engine section may include a structure multiplying both an answering rate to query items of the damage mode interactive query section and a matching rate to an answer when all damage factors are set as 100%, and then, multiplying correction coefficient so as to calculate a damage probability.

The diagnosis engine section may further includes a structure stepwise determining a damage probability based on the damage factor probability and a predetermined threshold value with respect to each damage factor. This diagnosis engine section may have a structure stepwise determining the damage factor at three grades, that is, "damage possibility is high", "there is a possibility of damage", and "there is no possibility of damage".

In the present invention, the damage factor is a vibration factor.

The present invention also provides, in another aspect, a method of diagnosing a damage factor comprising steps of:

selecting an answer to prepared query items based on data information given;

estimating a damage factor on the basis of the selected answer;

weighing the estimated damage factor;

collecting an answering rate and a matching rate of the weighed damage factor;

calculating a damage factor probability by multiplying correction coefficient by both the answering rate and the matching rate of the damage factor; and indicating a guidance for taking suitable course against the calculated damage factor probability.

According to the structures and characters of the present invention mentioned above, it is possible to provide more accurate damage (including vibration, position shifting, steam leaking, etc.) diagnosis results for a short time without depending on knowledge and experience of a person, who is in charge of damage diagnosis of machinery such as turbine rotor.

The nature and further characteristic features can be made more clear from the following descriptions made with reference to the accompanying drawings.

BRIEF DESCRIPTION OF THE DRAWINGS

In the accompanying drawings:

FIG. 2 is a view showing one example of a vibration mode interactive query section applied to the vibration diagnosis apparatus and its method according to the present invention of FIG. 1;

FIG. 3 is a view showing a diagnosis engine section applied to the vibration diagnosis apparatus and its method according to the present invention;

FIG. 4 is a matrix table calculating answering rate, matching rate and probability with respect to vibration factors by the diagnosis engine section applied to the vibration diagnosis apparatus and its method according to the present invention;

FIG. 5 is a diagnosis matrix table weighing and marking the vibration factors by diagnosis engine section applied to the vibration diagnosis apparatus and its method according to the present invention;

FIG. 8 is a view showing items of suitable courses to be taken based on vibration factor analysis in the vibration diagnosis apparatus and its method according to the present invention;

DESCRIPTION OF THE PREFERRED EMBODIMENT

Embodiments of apparatus and method of diagnosing damage factor of a machinery or equipment according to the present invention will be described below with reference to the accompanying drawings, and in the illustrated embodiments, vibration is referred to as one typical example of damage factors of turbine rotor as machinery or equipment.

Figure 1:
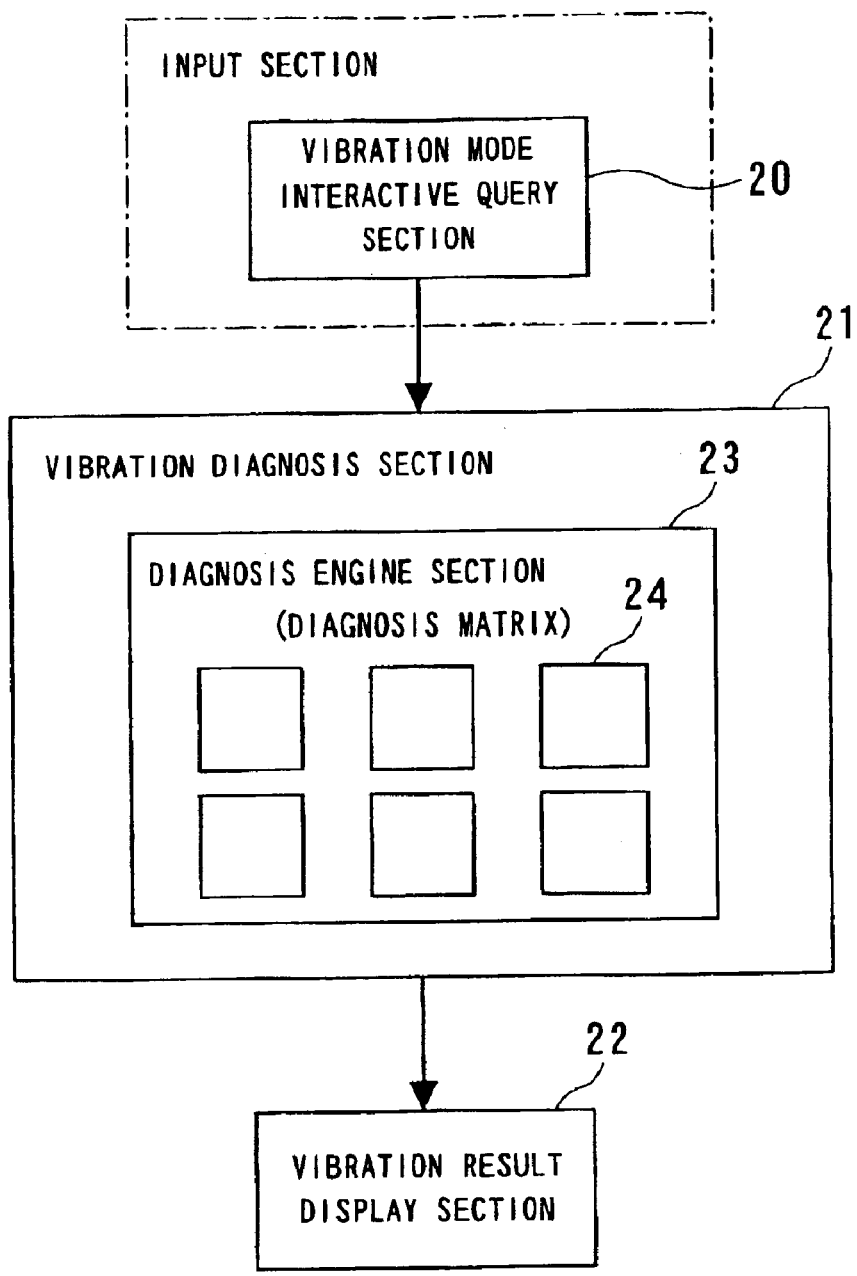
FIG. 1 is a functional block diagram schematically showing vibration diagnosis apparatus and its method according to one preferred embodiment of the present invention.

FIG. 1 is a block diagram schematically showing vibration diagnosis apparatus and method according to one preferred embodiment of the present invention.

According to this embodiment, the vibration diagnosis apparatus includes a vibration mode interactive query section 20 which is connected to vibration detector or abnormality diagnosis device, or like, such as shown in FIG. 8 and adapted to confirm inputted vibration information and operation process condition with respect to vibration generated in rotors such as turbine rotor, a vibration diagnosis section 21 which specifies the factor of the generated vibration and suitable courses to be taken from the information of the vibration mode interactive query section 20, and a diagnosis result display section 22 which displays the generation factors of the vibration estimated in the vibration diagnosis section 21 and suitable courses to be taken listed as guidance therein.

The above vibration diagnosis section 21 includes a diagnosis engine section 23 which estimates the generation factor of the vibration based on the information from the vibration mode interactive query section 20 and lists the estimated generation factors of the vibration, and also includes a diagnosis matrix section 24 which evaluates the individual generation factors independently.

Based on the above configuration, the vibration mode interactive query section 20 selects suitable one from a prepared group of answers with respect to the following many queries. The queries include the generation timing of the problem vibration (abnormal vibration value), waveform, amplitude and frequency of the generated vibration, and operating conditions of equipments when the vibration generates. Therefore, the vibration mode interactive query section 20 functions as database for featuring the problem vibration (abnormal vibration value).

Figure 2:
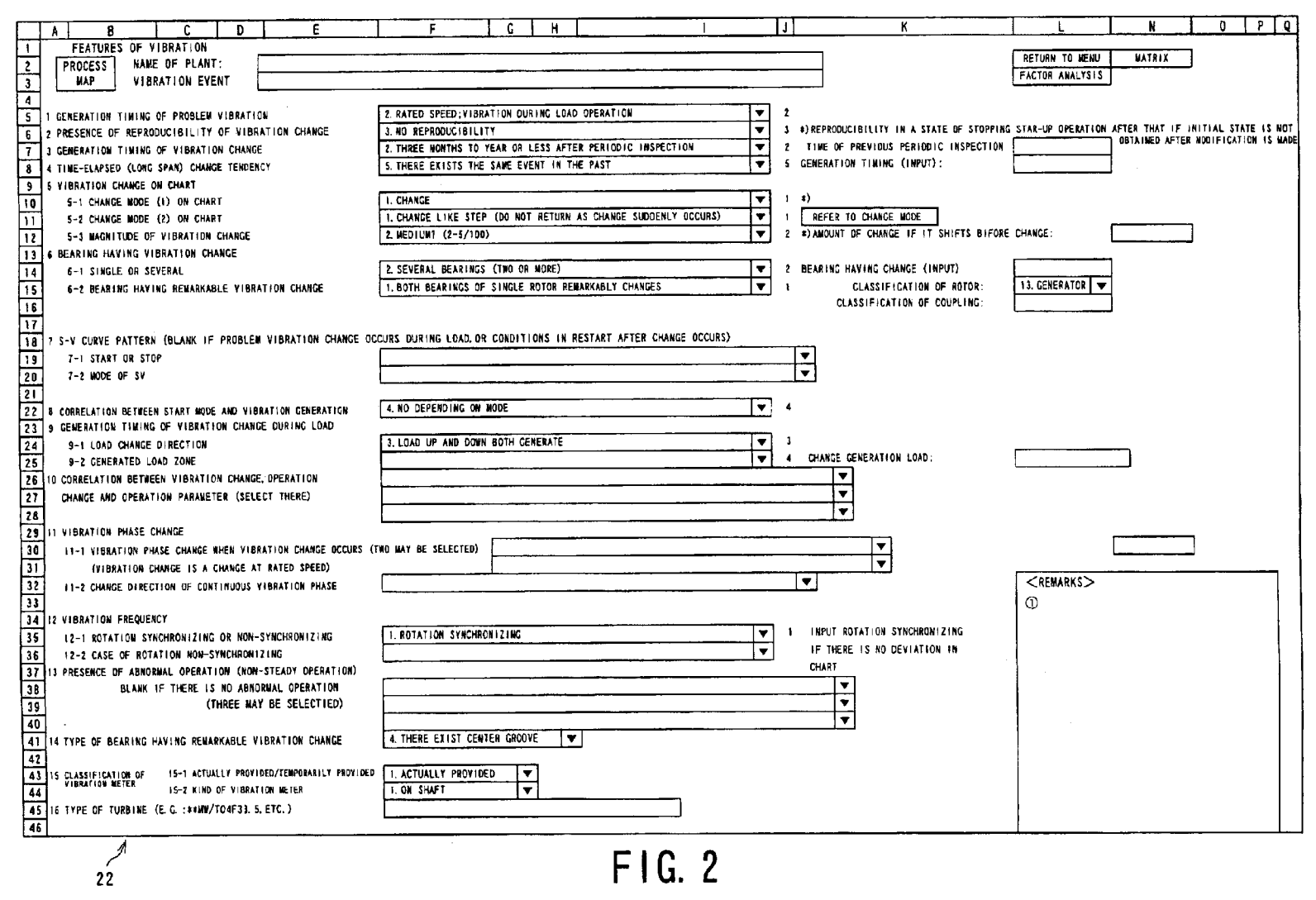

FIG. 2 shows one example of the interactive query by the vibration mode interactive query section 20. In the vibration mode interactive query section 20, query items are preset based on vibration theory and experience rule in order to further feature the problem vibration constituting a problem (abnormal vibration value). Based on the query items, a diagnosis responsible person makes an answer from detection data according to the query items. The answers are prepared considering features and characteristics to each vibration based on vibration theory and experience rule. Thus, the diagnosis responsible person selects the most suitable answer to the problem vibration (abnormal vibration value) from the group of answers.

As seen from the above description, the vibration mode interactive query section 20 is used as a so-called vibration carte, and functions as database for individual vibration contents.

On the other hand, the vibration diagnosis section 21 includes several diagnosis matrix (small matrix) sections 24, which have point distribution for further featuring individual vibrations in accordance with the vibration factor for each query and answer of the vibration mode interactive query section 20, divided as a small group, and a diagnosis engine (large matrix) section 23 collecting several small groups into one large group.

In the above diagnosis matrix section 24, vibration factors such as unbalanced vibration, rubbing vibration and oil whip vibration are sorted out. Further, a query group prepared by the vibration mode interactive query section 20 and an answer group prepared for each query are taken as the ordinate (column) and the abscissa (row) for each vibration factor and described in common to each matrix. The answer to the query for each vibration factor is weighed, that is, marked so that the difference of the vibration factors can be made.

The vibration diagnosis section 21 is built up in the manner that the diagnosis engine section 23, in which the diagnosis matrix section 24 independently evaluates the vibration diagnosis for each equipment operation mode condition, performs the following vibration diagnosis because the feature such as vibration waveform and frequency is changed by operation mode conditions in each vibration factor. In the independently evaluated information, the vibration factor having the highest weighed point is picked up and collected, and thereafter, is edited as the large matrix section, and thus, vibration diagnosis including various operation mode conditions of equipments can be performed.

FIG. 3 shows one example of the diagnosis engine section 23 in the vibration diagnosis section 21 shown in FIG. 1.

The diagnosis engine section 23 evaluates the vibration factor having the highest weighed point of the information evaluated independently by the diagnosis matrix section 24 as the vibration diagnosis result. Thereafter, the diagnosis engine section 23 picks up the vibration factor having highest point, and then, collects and edits it. In this case, operation mode conditions considered in the controlled equipment at a time when vibration generates are taken as the ordinate (row) and sorted in the following manner. For example, "during load" is displayed as "element-1" and "during start-up or stop process" is displayed as "element-2" and "during turning" is displayed as "element-n". The factors considered in the controlled equipment when vibration generates are taken as the abscissa (column) and sorted in the following manner. For example, "residual unbalanced vibration" is displayed as "factor-1", and "oil whip vibration" is displayed as "factor-n". Items "small matrix 1-1", "small matrix 1-2", more specifically, each diagnosis matrix expressing the weighed point is displayed on the intersection portion of the ordinate and the abscissa for each operation mode condition.

As described above, the reason why items are sorted as "small matrix 1-1" and "small matrix 1-2" is based on the following matter. For example, in "vibration resulting from scattering and come-off of rotating components generates as unbalanced vibration fluctuation" (factor-2), if the vibration generates during the acceleration and deceleration of rotational speed, vibration fluctuation at the dangerous speed of the turbine rotor (rotary shaft) remarkably appears. On the other hand, if the above vibration generates during load (element-1), sudden vibration fluctuation appears. Thus, the difference occurs between phenomenon events depending on operation mode conditions of the controlled equipment.

The vibration diagnosis in the diagnosis engine section 23 is summarized as shown in FIG. 4 in the following manner. That is, as seen from each diagnosis matrix of FIG. 5, the same technical matters as the query matter displayed by the vibration mode interactive query section 20 are displayed on the abscissa (column). In the ordinate (row), prepared answers are selected, and point for weighing is given. The highest point of the given points is picked up, and based on the picked-up highest point, answering rate, matching rate and probability of the vibration factor obtained from vibration features and operation process are calculated. The calculated result thus obtained is summarized for duvh each query as shown in FIG. 4. This is because of preventing biased analysis when specifying the vibration factor.

FIG. 4 shows one example of collecting the diagnosis result in the diagnosis engine section 23 as matrix.

In the matrix, an interactive query item section 25 presenting the vibration factors are displayed as the ordinate (column). Further, calculated results of the diagnosis matrix shown in FIG. 5, that is, answering rate 26 which shows an answering rate corresponding to the queries shown in the interactive query item section 25, matching rate 27 which shows a matching rate of the number of answers when all vibration factors are set to 100% and vibration factor probability 28 which is calculated by multiplying prepared correction coefficient (see FIG. 6) by both answering rate and matching rate in order to further discriminate the answering rate. Weighed point is given to each of the above answering rate 26, matching rate 27 and vibration factor probability 28, are displayed as the abscissa (row) correspondingly to the query items of the above interactive query item section 25. Of the weighed points, the highest value of the points of the vibration factor probability 28 is set as the vibration factor.

The above answering rate 26, matching rate 27 and vibration factor probability 28 are displayed for each "element-1", "element-2" . . . of the operation mode conditions shown in FIG. 3.

FIG. 5 shows one example of diagnosis matrix for specifying the vibration factor in the diagnosis engine section 23.

The diagnosis matrix includes a vibration mode query item section 29 equivalent to the matters shown in FIG. 2 used as the ordinate (column) and a weighing point section (vibration feature factors) 30 used as the abscissa (row). The given points are obtained in the following manner that the answer is selected from the answer group prepared for each query of the vibration mode query items 29, and points are weighed to the selected answer.

In the diagnosis matrix, high point is given to the query of the vibration mode query items 29 in the weighing point section 30 if it is determined that the query has close relation to the vibration factor judging from the detected data. If it is determined that the query has not so close relation to the vibration factor, a low point is given to the query in the weighing point section 30.

If it is determined that the query has not close relation to the vibration factor, a minus point is given to the query in the weighing point section 30 so that the variation of the weighing point section 30 is emphasized.

In the weighing point section 30 of the diagnosis matrix, a different point for each answer of the answer group is independently set based on vibration theory and experience rule. Every time when new vibration factors are found, the point is re-considered and corrected. The point is not constant, and updated as the need arises.

Figure 6:
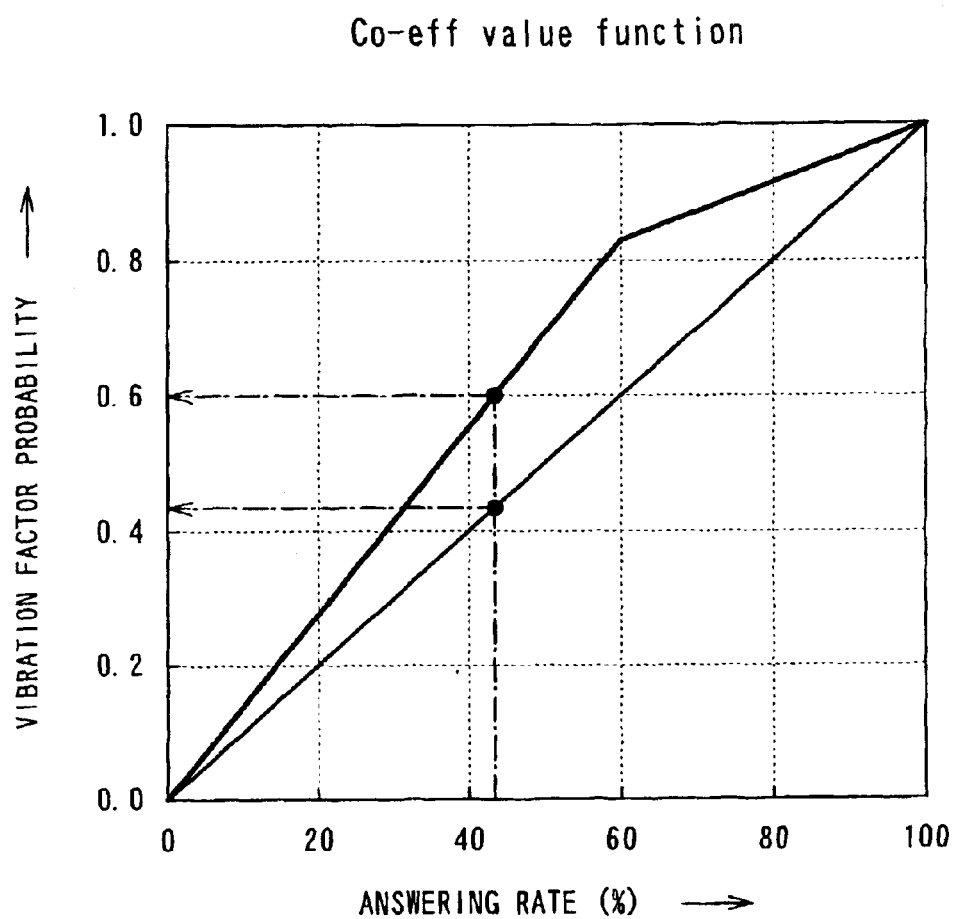
FIG. 6 is a graph showing correction factor used for determining a vibration factor probability of the diagnosis matrix in the vibration diagnosis apparatus and its method according to the present invention.

FIG. 6 is a graph showing a correction coefficient line 31 used for multiplying a correction value when calculating the vibration factor probability of the diagnosis matrix shown in FIG. 5. As seen from the graph, correction value is added to the above answering rate, and a deviation bent point is set at the answering rate 60% to the vibration mode query items (query matters) of FIG. 2 in order to further feature the vibration factor. In this manner, the difference is provided in correction coefficient between the probability ranges from 0% to 60% and 60% to 100%. By doing so, it becomes possible to enhance the vibration factor probability even if information is not so provided and to make discrimination between technical matters, which are regarded as the vibration factor and are not regarded as the same.

Figure 7:
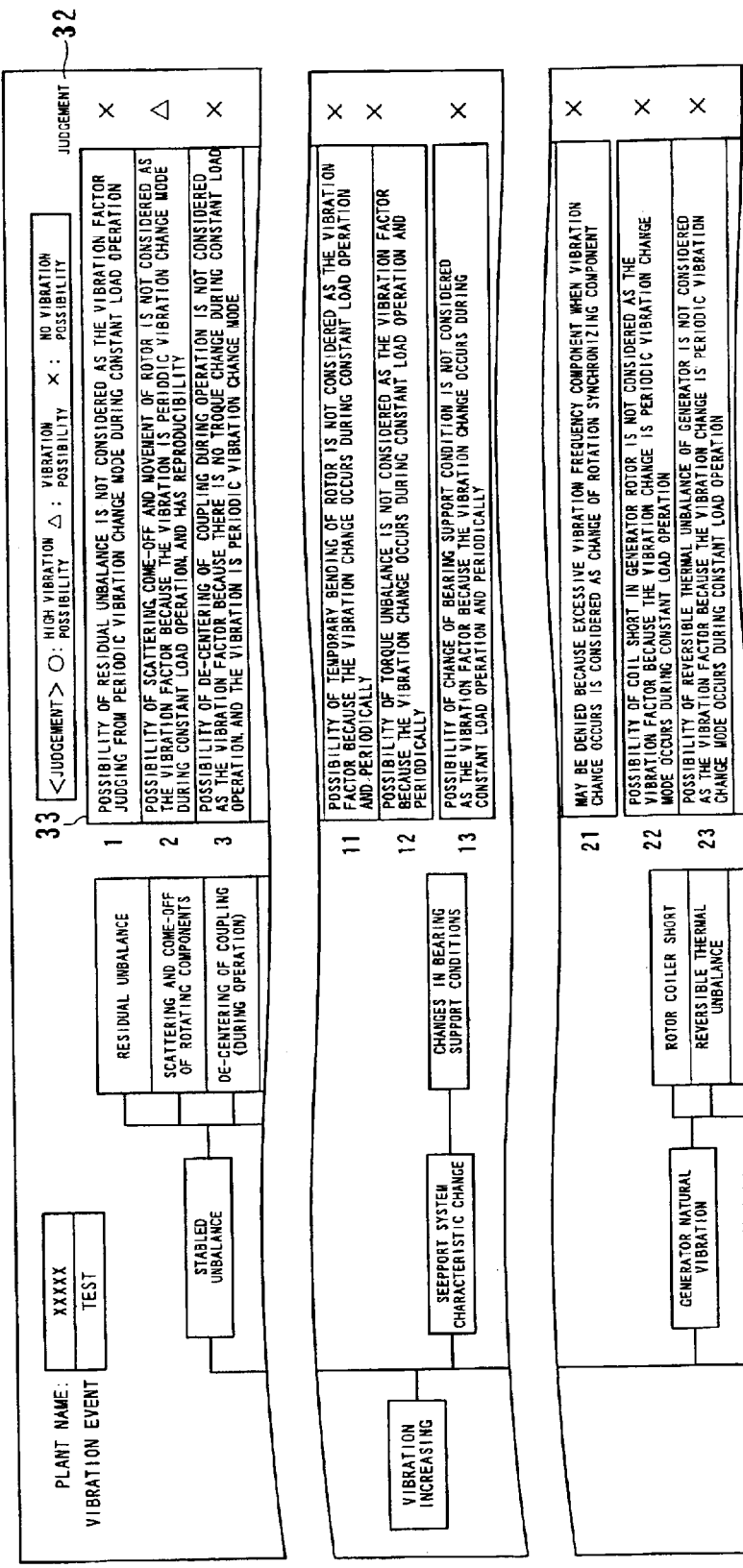
FIG. 7 is a view showing vibration factor analysis result lists in the vibration diagnosis apparatus and its method according to the present invention.

FIG. 7 shows one example of a vibration factor analysis result list which is estimated on the basis of the vibration factor probability collected by the diagnosis matrix (see FIG. 4) summarized in the diagnosis engine section 23.

In the vibration factor analysis result list, technical display items (vibration factors) correspond to technical matters (names) displayed on the interactive query item section 25 used as the abscissa (column) of FIG. 3 and FIG. 4.

The vibration factor is determined based on the probability for each vibration factors collected in the diagnosis matrixes of FIG. 3 and FIG. 4. In a determining flag section 32, the vibration factor is automatically determined using a predetermined threshold value. In this case, in the determining flag section 32, three kinds of marks; i.e. (1) the mark ○ given in the case where "vibration possibility is high", (2) the mark Δ given in the case where "there is a possibility of vibration" and (3) the mark X given in the case where "there is no possibility of vibration", are given to the vibration factor probability.

The threshold value for determining the vibration factor can be arbitrarily modified by depressing a threshold value setting ON button.

An evaluation content section 33 to the technical display items (vibration factor) is automatically extracted from a prepared evaluation content list. Of course, the evaluation content can be manually edited.

FIG. 8 shows one example of a diagnosis result display section 22 displaying guidance of suitable courses to be taken against the vibration factor specified on the basis of the vibration diagnosis result.

In the diagnosis result display section 22, a diagnosis course item section 34 to the vibration factor is taken as the ordinate (column), and a vibration factor item section 35 is taken as the abscissa (row).

In an operation mode input section 36, two items "operating" and "stopping" are utilized.

The diagnosis result display section 22 is provided with a recommended flag 37 for selecting the diagnosis course item section 34 with respect to the vibration factor item section 35.

In the diagnosis result display section 22 having the above configuration, for example, if residual unbalance (factor No. 1) is selected from the vibration factor item section 35 as the vibration factor, the following items are given in the diagnosis course item section 34 in the mode "operating" of the operation mode input section 36. Further, "1" is set as the recommended flag 37 on each of the first item "recommend field balance", the second item "forget bolt of coupling part and tool (box)", the third item "recommend to stop, and to open window" and the fourth item "recommend vibration measurement (including frequency analysis) by IRD. The above items are given as the list of suitable courses to be taken.

Figure 9:
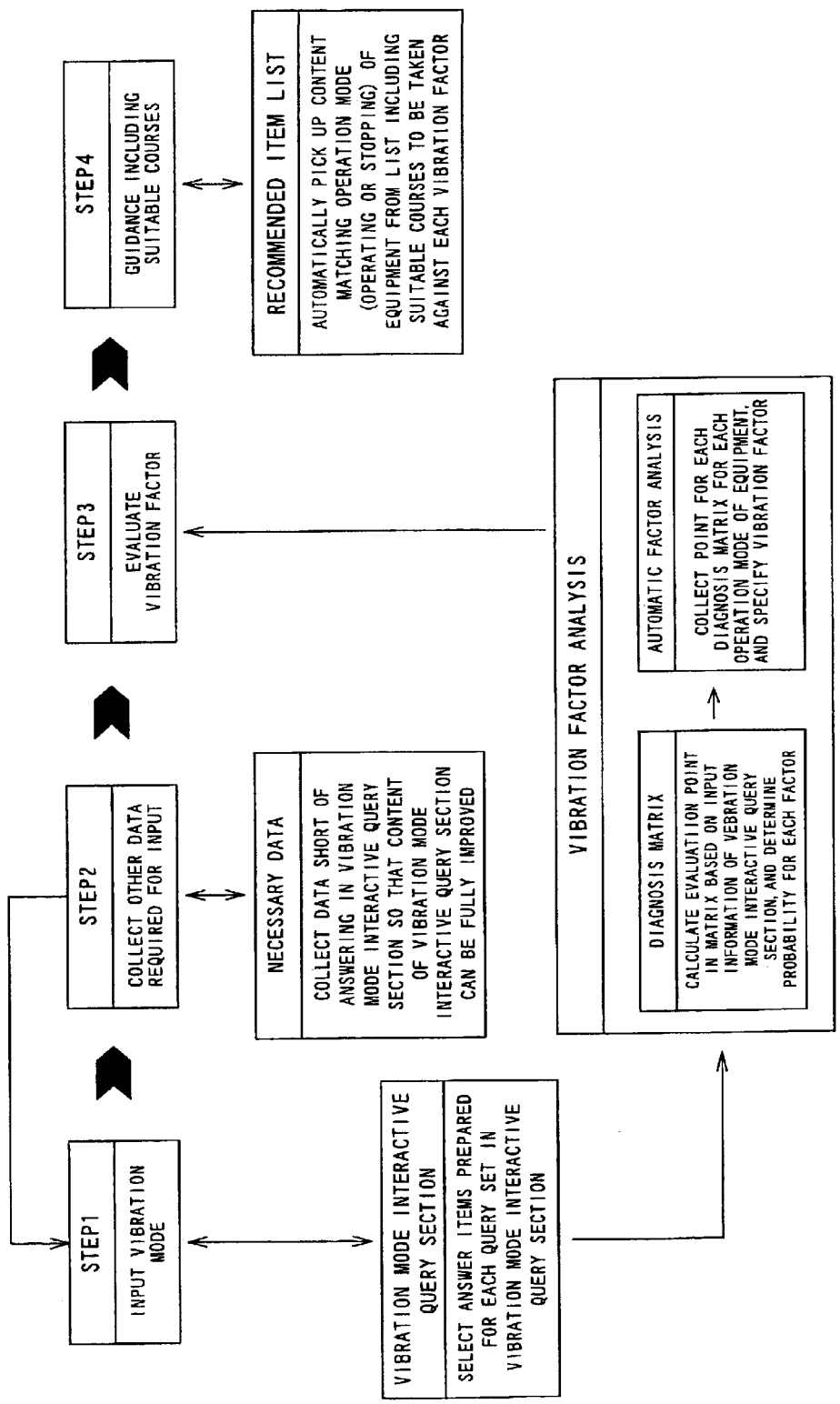
FIG. 9 is a flowchart showing the procedure of vibration analysis evaluation in the vibration diagnosis apparatus and its method according to the present invention.
Figure 10:
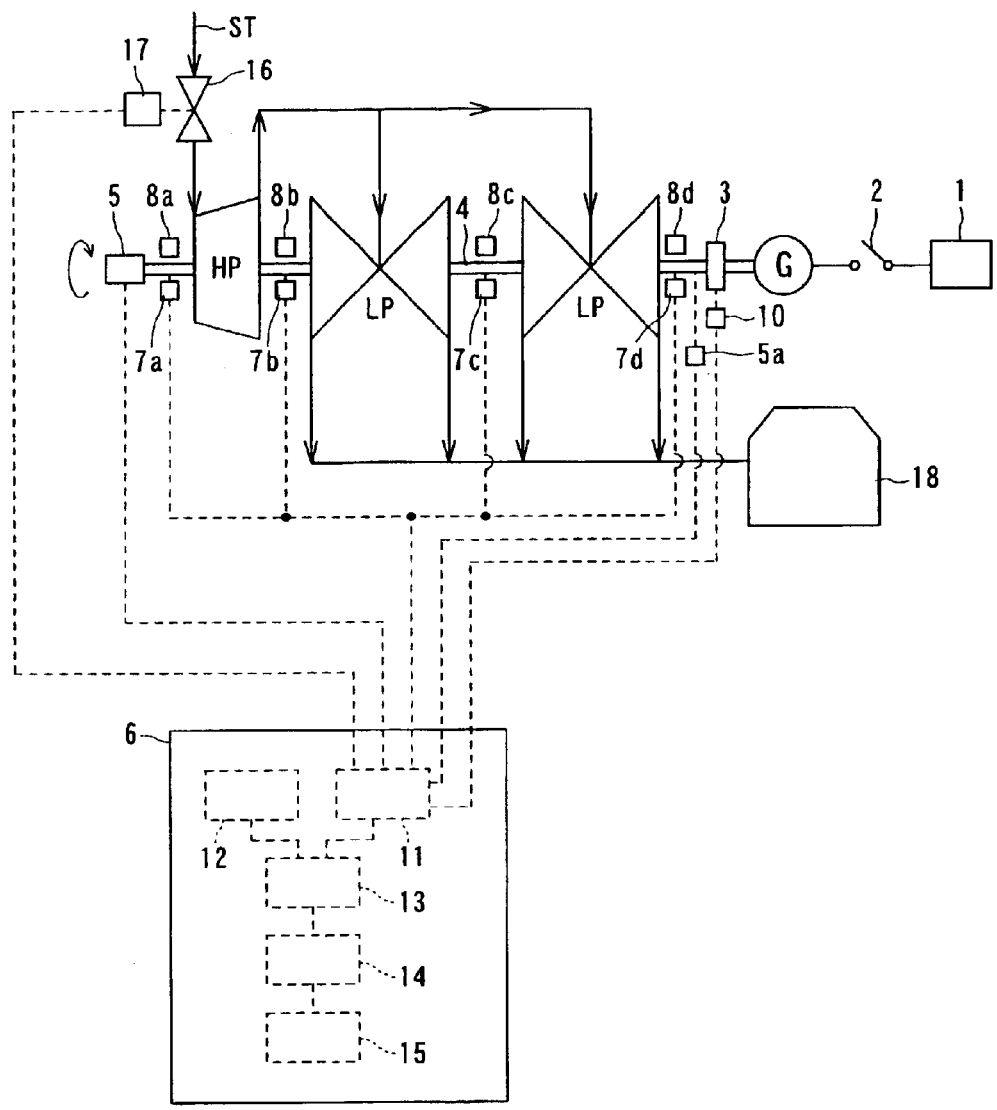
FIG. 10 is a system diagram schematically showing a conventional vibration diagnosis apparatus.

FIG. 9 is a flowchart showing one example the vibration analysis evaluation procedure according to the present invention.

In step 1, the diagnosis responsible person inputs a vibration mode using the vibration mode interactive query section 20 shown in FIG. 1.

In the above input, the diagnosis responsible person mechanically selects an answer considered as the most suitable to the query from the prepared answer group to each query matter, as depicted in FIG. 2. When the person successively makes an answer to each query, the vibration diagnosis section 21 automatically carries out the work for specifying the vibration using the diagnosis matrix, that is, collects the vibration factor probability.

If the data required for the above vibration mode input in step 1 is short, the required data is collected in step 2, and thereafter, complemented data is again reflected to the vibration mode interactive query section 20.

On the other hand, the vibration diagnosis section 21, the diagnosis matrix section 24 automatically calculates and collects the vibration factor probability using each diagnosis matrix on the basis of the vibration mode information inputted in step 1 for each operation mode of equipment and for each vibration factor, as shown in FIG. 5. Based on the above result, the diagnosis engine section 23 automatically carries out factor analysis evaluation. Namely, the factor analysis evaluation of step 3 is carried out by the vibration mode input in step 1.

When the vibration factor is specified, in step 4, suitable courses to be taken against the vibration factor are selected from the recommended item list for each operation mode of equipment, as shown in FIG. 8. Thereafter, the diagnosis result display section 22 displays the list including the guidance showing the standard course.

It is to be noted that the present invention is not limited to the described embodiment and many other changes and modifications may be made without departing from the scopes of the appended claims.

What is claimed is:

1. An apparatus for diagnosing a damage factor of machinery, comprising:
   a machinery damage mode interactive query section configured to determine a damage factor event of the machinery and a characteristic feature thereof from input information;
   a machinery damage factor diagnosis section configured to estimate a damage factor based on the information from the machinery damage mode interactive query section; and
   a diagnosis result display section configured to indicate the estimated damage factor and a guidance for countermeasure to be taken against the damage factor,
   wherein said machinery damage factor diagnosis section includes a diagnosis matrix section including several small matrices featuring a plurality of machinery damage factors based on the damage factor event, the characteristic feature, and damage generated conditions, and a diagnosis engine section configured to generate one matrix by collecting several small matrices; and
   said diagnosis engine section is configured to multiply an answering rate to query items of the damage mode interactive query section and a matching rate to an answer when all damage factors are set as 100%, and to miltiply a correction coefficient so as to calculate a damage probability.

2. The apparatus for diagnosing damage factor of machinery according to claim 1, wherein said diagnosis matrix section is configured to generate a matrix table on the basis of the machinery damage factors having direct relation to the damage factor event and feature, and to give a weighing point to an intersection portion of the table in accordance with a relation of the damage factor with respect to the damage factor event and feature.

3. The apparatus for diagnosing damage factor according to claim 1, wherein said diagnosis engine section is configured to assign minus points to the damage factor event and feature having low damage factor probability in the matrix table.

4. The apparatus for diagnosing damage factor according to claim 1, wherein said diagnosis engine section is configured to stepwise a damage probability based on the damage factor probability and a predetermined threshold value with respect to each damage factor.

5. The apparatus for diagnosing damage factor according to claim 1, wherein said diagnosis engine section is configured stepwise determine the damage factor at three grades, that is, "damage possibility is high", "there is a possibility of damage", and "there is no possibility of damage".

6. The apparatus for diagnosing damage factor according to claim 1, wherein said damage factor is a vibration factor.

7. A method of diagnosing a damage factor, comprising:
   selecting an answer to prepared query items based on data information given;
   estimating a damage factor on the basis of the selected answer;
   weighing the estimated damage factor;
   collecting an answering rate and a matching rate of the weighed damage factor;
   calculating a damage factor probability by multiplying a correction coefficient by both the answering rate and the matching rate of the damage factor; and
   indicating a guidance for taking suitable course against the calculated damage factor probability.

8. The method of diagnosing a damage factor according to claim 7, wherein said damage factor is a vibration factor.

9. A system for diagnosing a damage factor, comprising:
   means for selecting an answer to prepared query items based on data information given;
   means for estimating a damage factor on the basis of the selected answer;
   means for weighing the estimated damage factor;
   means for collecting an answering rate and a matching rate of the weighed damage factor;
   means for calculating a damage factor probability by multiplying a correction coefficient by both the answering rate and the matching rate of the damage factor; and
   means for indicating a guidance for taking suitable course against the calculated damage factor probability.

10. The system of claim 9, wherein the means for estimating comprise:
    means for estimating a vibration factor based on the selected answer.

* * * * *